June 3, 1969  V. JOHNSON  3,447,263

PLANT STAKES

Filed Feb. 10, 1967

INVENTOR:-
VEIGA JOHNSON
HER ATT'Y'S

United States Patent Office 3,447,263
Patented June 3, 1969

3,447,263
PLANT STAKES
Veiga Johnson, 498 Home St., Winnipeg 10,
Manitoba, Canada
Filed Feb. 10, 1967, Ser. No. 615,163
Int. Cl. A01g *17/14;* F16l *27/12, 37/02*
U.S. Cl. 47—47                    1 Claim

ABSTRACT OF THE DISCLOSURE

A plant stake made in sections of tubular material so that the sections can be added to one another to increase the length of the stake as the plant grows and having internal connections between the sections and apertured in the lower end of the soil engaging section to permit the passage of water and/or liquid fertilizer through the stake into the ground around the roots of the plant supported by the stake.

---

My invention relates to new and useful improvements in plant stakes.

It is normal to use wooden stakes to train and support plants during the growing period.

However, as the plants normally being supported may be grown to a height of several feet, it is conventional to insert the stakes at an early stage of growth so that the plants need not be disturbed when they need supporting.

As it may take several months for a plant to reach the full height of the stake, the presence of a plurality of bare stakes in the garden is unsightly.

I have overcome this disadvantage by providing metal or plastic stakes which can be added to in height as desired and to keep pace with the growth of the plants being supported, without disturbing the roots as the first or base stake is preferably inserted at the time of setting out the plant in the garden.

The principal object and essence of my invention is therefore to provide plant stakes which can be increased in length as required thus eliminating the normal unsightliness of a forest of wooden stakes in a flower bed or vegetable garden.

Another object of the invention is to provide a plant stake of the character herewithin described which is tubular and hollow thus permitting water or liquid fertilizer to be poured down the center of the stake to adjacent the root system of the plant.

A yet further object of the invention is to provide a device of the character herewithin described in which the plant stakes are readily stored in a relatively small space as compared to the usual unsightly and relatively long wooden stakes.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard in this connection being had to the accompanying figures in which.

In the drawings like characters of reference indicate corresponding parts in the different figures.

Figures 1, 2, 3:
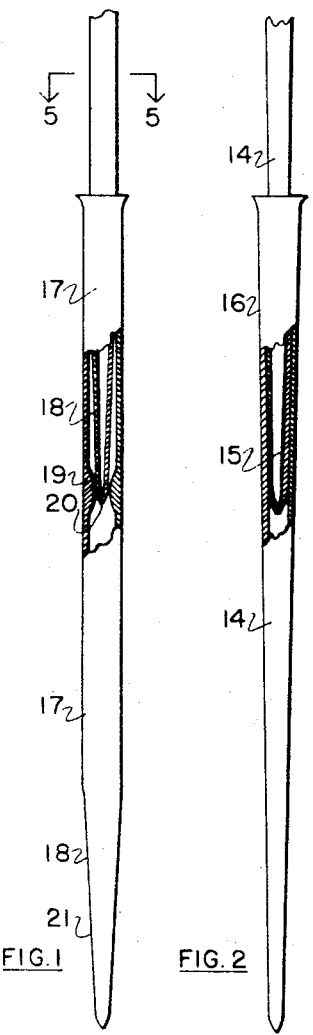
FIGURE 1 is a side view of one embodiment of my invention.
FIGURE 2 is a side view of an alternative embodiment of my invention.
FIGURE 3 is a side view of a third embodiment of my invention.

Proceeding therefore to describe the invention in detail, all of the embodiments illustrated in FIGURES 1, 2 or 3 are preferably manufactured of metal or plastic and colored so that they are not unsightly in use.

Dealing first with the embodiment shown in FIGURE 3, this comprises a plurality of tubular elements 10 which are manufactured of hollow tubular stock.

Figure 6:
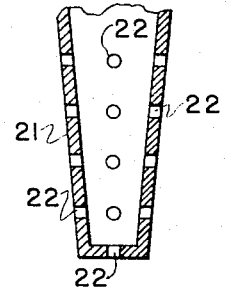
FIGURE 6 is an enlarged fragmentary sectional view of the lower end of the stake.

The lower end 11 of the lowermost or soil engaging section 10 may be tapered as at 12 to facilitate the insertion thereof into the ground but this tapered end is apertured at the lowermost end to permit the passage therethrough of water or liquid fertilizer. If desired, additional apertures 22 may be formed in the sides as shown in FIGURE 6.

Figure 4:
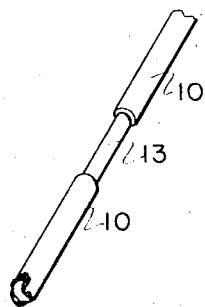
FIGURE 4 is an isometric view of the junction between adjacent sections of the stake shown in FIGURE 3, the same being shown in an extended position.
Figure 5:
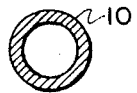
FIGURE 5 is a cross section of one of the stake sections.

The sections 10 are joined together by the provision of a hollow tubular portion 13 which is telescoped within the adjacent sections 10 and may be held or fastened within one of the sections, either frictionally or by a swaging action or the like and FIGURE 4 shows a typical junction of this embodiment with the sections extended.

Further sections may be added upon the upper end of the uppermost section as desired and as the necessity arises due to plant growth.

The embodiment shown in FIGURE 2 is also manufactured from tubular stock but the sections 14 are longitudinally tapered so that the lower end portion 15 of one section may be inserted within the upper end portion 16 of the next lower section 14, the gradual taper providing a wedging effect and thus maintaining the sections aligned and assembled.

Additional sections may, of course, be added in a similar way to that hereinbefore described.

In FIGURE 1 the adjacent sections are identified by the reference characters 17. These sections are also of tubular stock with only the lower portions 18 tapered, the remaining portions being cylindrical.

The upper cylindrical portions are indented at 19 as shown in FIGURE 1 upon each side thereof to act as a steadying support for the lowermost end 20 of the inserted section.

The lowermost ends of the sections shown in FIGURES 1 and 2 together with the lowermost end 12 of the section 10 shown in FIGURE 3, are shown in detail in FIGURE 6. The typical lowermost end portion is generally designated 21 in FIGURE 6. This lowermost end is provided with base aperture 22 thus permitting fluid passage through the connected sections so that water or liquid fertilizer or a mixture of both may be poured down the plant stake from the uppermost end thereof and be distributed around the root system of the plant which the stake is supporting.

Alternatively or in conjunction with the aperture 22, a plurality of additional apertures 22 may be formed in the wall of the end portion 21 of the section to facilitate the seepage of the liquid from the lower end portion of the lowermost section, into the surrounding soil.

What I claim as my invention is:

1. A sectional plant stake comprising at least two elongated hollow stake sections which are separably connected together and provide a fluid passage therethrough, each of said sections having an open cylindrical upper end portion and a downwardly tapered lower end portion having a plurality of drainage openings therein, and said end portion being adapted to be forced into the ground, the cylindrical upper end portion of one section having slidably telescoped therein the tapered lower end portion of the other section, and inwardly projecting protuberances provided in the cylindrical upper end portion of said one section, said protuberances supportably engaging the tapered lower end portion of said other section.

References Cited

UNITED STATES PATENTS

| | | | |
|---|---|---|---|
| 1,758,839 | 5/1930 | Kelsey | 47—47 |
| 2,837,869 | 6/1958 | Chatten | 47—48.5 |
| 3,165,863 | 1/1965 | Duran | 47—47 |

FOREIGN PATENTS 202,146  9/1908  Germany.

ROBERT E. BAGWILL, *Primary Examiner.*

U.S. Cl. X.R.

285—302